(12) United States Patent
Asamizu (10) Patent No.: US 8,406,920 B2
(45) Date of Patent: Mar. 26, 2013

(54) WORK MOUNTING SYSTEM AND METHOD OF MOUNTING WORK

(75) Inventor: Kenichi Asamizu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 12/933,795

(22) PCT Filed: Feb. 25, 2009

(86) PCT No.: PCT/JP2009/053376
§ 371 (c)(1),
(2), (4) Date: Sep. 21, 2010

(87) PCT Pub. No.: WO2009/122824
PCT Pub. Date: Oct. 8, 2009

(65) Prior Publication Data
US 2011/0022217 A1    Jan. 27, 2011

(30) Foreign Application Priority Data
Mar. 31, 2008   (JP) ................ 2008-092219

(51) Int. Cl.
*G06F 19/00* (2011.01)
(52) U.S. Cl. ......................... 700/245; 700/264
(58) Field of Classification Search .............. 700/245, 700/264; 900/6; 385/56
See application file for complete search history.

(56) References Cited

U.S. PATENT DOCUMENTS

| | | | | |
|---|---|---|---|---|
| 4,613,942 A | * | 9/1986 | Chen | 700/259 |
| 5,345,675 A | * | 9/1994 | Yamanaka et al. | 29/894.3 |
| 6,060,855 A | * | 5/2000 | Matsuhashi | 318/652 |
| 6,193,142 B1 | | 2/2001 | Segawa et al. | |
| 6,763,573 B2 | * | 7/2004 | Walt et al. | 29/707 |
| 2008/0168639 A1 | | 7/2008 | Otake et al. | |

FOREIGN PATENT DOCUMENTS

| | | |
|---|---|---|
| EP | 1 345 099 A2 | 9/2003 |
| GB | 2 264 569 A | 9/1993 |
| GB | 2 405 465 A | 3/2005 |
| JP | 01-208285 A | 8/1989 |

(Continued)

OTHER PUBLICATIONS

Extended European Search Report issued European Application No. 09726833.8, mailed Oct. 20, 2011.

*Primary Examiner* — Kidest Bahta
(74) *Attorney, Agent, or Firm* — Arent Fox LLP (57) ABSTRACT

This object aims to provide a work mounting system which has an improved usability and can be miniaturized. A work mounting system (1) is used to mount a sunroof member (3) on the inner panel (2A) of a body (2). The work mounting system (1) comprises a conveying robot (4) for holding and conveying the sunroof member (3), a mounting robot (5) with a nut runner for tightening bolts and a CCD camera, and a controller (6) for controlling the conveying robot (4) and the mounting robot (5). The controller (6) controls the conveying robot (4) so as to hold the sunroof member (3) and convey the member to the inner panel (2A) of the body (2), and controls the mounting robot (5) so as to photograph the bolt holes of the sunroof member (3) and the inner panel (2A) by the CCD camera, calculates the positions of the bolt holes and the inner panel (2A), corrects operation of the mounting robot (5) according to the calculated positions, and secures the sunroof member (3) to the inner panel (2A) at two positions by nut runners.

3 Claims, 9 Drawing Sheets

FOREIGN PATENT DOCUMENTS

| | | |
|---|---|---|
| JP | 08-085092 A | 4/1996 |
| JP | 08-090471 A | 4/1996 |
| JP | 08-206983 A | 8/1996 |
| JP | 10-029573 A | 2/1998 |
| JP | 10-249536 A | 9/1998 |
| JP | 2005-329782 A | 12/2005 |
| JP | 2006-102847 A | 4/2006 |
| JP | 2006-181459 A | 7/2006 |
| WO | WO 03/034165 A1 | 4/2003 |
| WO | WO 2006/130625 A2 | 12/2006 |

\* cited by examiner

WORK MOUNTING SYSTEM AND METHOD OF MOUNTING WORK

TECHNICAL FIELD

The present invention relates to a work mounting system and a method of mounting a work. More specifically, it relates to a work mounting system and a work mounting method of mounting a sunroof to the body of an automobile.

BACKGROUND ART

Conventionally, a sunroof for letting in outside light has been provided in the body of an automobile. This sunroof is formed by mounting a sunroof unit to the body.

A robot for mounting the sunroof unit is disposed in a production line of the body (refer to Patent Document 1). This robot for mounting the sunroof unit includes a robot arm, and a hand that is provided to an end of the robot arm so as to support the sunroof unit.

The hand is a rectangular frame shape, and includes two tapering taper pins, three cylinder units, two locating pins, and eight nut runners. A bolt is held in each nut runner. With this hand, the positions of the locating pins and the nut runners are determined in advance depending on the shape of the sunroof unit.

The operations of the above mounting robot are as follows.

First, the sunroof unit is supported by the hand. More specifically, by inserting the locating pins into the sunroof unit, the sunroof unit is positioned relative to the hand, and bolts held in the nut runners of the hand are inserted into bolt holes of the sunroof unit.

Thereafter, the robot arm is controlled to bring the sunroof unit into the body interior from an opening of the body prepared for a front window.

Next, the tapering taper pins of the hand are inserted to locating holes formed in mounting positions of the body, and the hand is positioned relative to the body.

Next, a cylinder unit is driven to cause the sunroof unit to approach the mounting position of the body, while the nut runners are driven to cause the bolts to be screwed with nuts of the body.

According to such a mounting robot, the sunroof unit can be conveyed and mounted with one hand.

Patent Document 1: Japanese Patent No. 2672825

DISCLOSURE OF THE INVENTION

Problems to be Solved by the Invention

In recent years, it is often the case that a plurality of vehicle models is produced on one production line in order to make production lines operate efficiently. In this case, the shape of a sunroof unit may change greatly depending on a vehicle model.

However, since the positions of the locating pins and the nut runners are determined in advance according to the shape of the sunroof unit for the hand structure described above, the versatility thereof is low, and thus it has been necessary to switch hands for each vehicle model.

In addition, there has been a problem in that the facility increases in size since the sunroof unit is conveyed and mounted by one hand.

The present invention has an object of providing a work mounting system and a method of mounting a work that are high in versatility and enable size reduction.

Means for Solving the Problems

A work mounting system of the present invention (e.g., a work mounting system 1 described later) that mounts a first work (e.g., a sunroof member 3 described later) to a mounting part (e.g., a nut 44 described later) of a second work (e.g., a body 2 described later) with a fastening member (e.g., a bolt 51A described later), includes: a conveying robot (e.g., a conveying robot 4 described later) configured to grip and convey the first work; a mounting robot (e.g., a mounting robot 5 described later) that has a camera (e.g., a CCD camera 241 described later) and a tightening device (e.g., a nut runner 23 described later) configured to tighten the fastening member (e.g., a bolt 51A described later); control means (e.g., a controller 6 described later) configured to: control the conveying robot and the mounting robot. The control means is configured to: control the conveying robot to grip and convey the first work to the mounting part of the second work; control the mounting robot to photograph by the camera a reference part (e.g., a bolt hole 33 described later) of the first work and a mounting part of the second work; calculate positions of the reference part of the first work and of the mounting part of the second work; correct movement of at least one among the conveying robot and the mounting robot based on the positions thus calculated; and cause the tightening device to fix at least two locations of the first work to the mounting part of the second work.

A work mounting method of the present invention is for mounting a first work to a mounting part of a second work with a fastening member, and uses a conveying robot configured to grip and convey the first work and a mounting robot that has a camera and a tightening device configured to tighten the fastening member. The method includes: controlling the mounting robot to photograph the mounting part of the second work by the camera, and calculating a position of the mounting part of the second work; controlling the conveying robot to grip and convey the first work to a vicinity of the mounting part of the second work; controlling the mounting robot to photograph a reference part of the first work by the camera; calculating a position of the reference part of the first work; correcting movement of the mounting robot based on the positions calculated; and causing the tightening device to fix at least two locations of the first work to the mounting part of the second work.

According to this invention, the first work is mounted to the mounting part of the second work in the following sequence.

First, the mounting part of the second work is photographed by the camera of the mounting robot, and the position of this mounting part of the second work is calculated based on the photographed image.

Next, the first work is gripped by the conveying robot at a work supply location. This first work is conveyed and is made to stop at a vicinity of the mounting part of the second work.

Next, a reference part of the first work is photographed by the camera of the mounting robot. Based on this photographed image, the position of the reference part of the first work is calculated.

Next, the tightening device of the mounting robot fixes at least two locations of the first work to the mounting part of the second work with fastening members. Herein, the positions of the mounting part of the second work and the reference part of the first work are applied to movement of the mounting robot, so that movement of the mounting robot is corrected.

In this manner, the roles are divided between the conveying robot and the mounting robot such that the conveying robot performs only conveyance of the first work and the mounting robot performs only positioning and mounting of the first work. Since it is possible to allow each of the conveying robot and the mounting robot to be structurally optimum according to their roles so as to cope with a case where shapes of first works greatly differ from one model to another, the versatility is raised.

In addition, since the conveying robot and the mounting robot can be simply configured, the system can be reduced in size.

Moreover, since the camera and the tightening device are built into the mounting robot, it is possible to perform an operation to fix the first work to the second work continuously after the first work and the second work have been sensed by the camera, thereby enabling the operational work hours to be shortened.

A work mounting method of the present invention is for mounting a first work to a mounting part of a second work with a fastening member and uses a conveying robot configured to grip and convey the first work and a mounting robot that has a camera and a tightening device configured to tighten the fastening member. The method includes: controlling the mounting robot to photograph a mounting part of the second work by the camera, and calculating a position of the mounting part of the second work; controlling the conveying robot to grip the first work and start conveyance thereof towards the mounting part of the second work, controlling the mounting robot to photograph a reference part of the first work by the camera, and calculating a position of the reference part of the first work; correcting movement of the conveying robot based on the positions of the reference part of the first work and the mounting part of the second work, and conveying the first work to a vicinity of the mounting part of the second work; and correcting movement of the mounting robot based on the position of the mounting part of the second work, and causing the tightening device to fix at least two locations of the first work to the mounting part of the second work.

According to this invention, the first work is mounted to the mounting part of the second work in the following sequence.

First, the mounting part of the second work is photographed by the camera of the mounting robot, and the position of this mounting part of the second work is calculated based on the photograph image.

Next, the first work is gripped by the conveying robot at a work supply location, and conveyance of the first work is started towards the mounting part of the second work. At the same time, the mounting robot is controlled to photograph the reference part of the first work by the camera, and the position of the reference part of the first work is calculated.

Next, the first work is conveyed to a vicinity of the mounting part of the second work, and stopped. Herein, the positions of the reference part of the first work and the mounting part of the second work are applied to movement of the conveying robot, so that the movement of the conveying robot is corrected.

Next, the tightening device of the mounting robot fixes at least two locations of the first work to the mounting part of the second work with fastening members. Herein, the position of the mounting part of the second work is applied to movement of the mounting robot, so that movement of the mounting robot is corrected.

Since the position of the reference part of the first work has been calculated during conveyance of the first work, it is possible to accurately convey the first work to a vicinity of the mounting part of the second work.

In addition, after the conveyance of the first work has completed, the first work can be immediately fixed to the mounting part of the second work by way of the mounting robot without photographing the reference part of the first work by the mounting robot. Therefore, the cycle time can be further shortened.

Effects of the Invention

According to the present invention, the roles are divided between the conveying robot and the mounting robot such that the conveying robot performs only conveyance of the first work and the mounting robot performs only positioning and mounting of the first work. Since it is possible to allow each of the conveying robot and the mounting robot to be structurally optimum according to their roles so as to cope with a case where shapes of first works greatly differ from one model to another, the versatility is raised. In addition, since the conveying robot and the mounting robot can be simply configured, the system can be reduced in size. Moreover, since the camera and the tightening device are built into the mounting robot, it is possible to perform an operation to fix the first work to the second work continuously after the first work and the second work have been sensed by the camera, thereby enabling the operational work hours to be shortened.

EXPLANATION OF REFERENCE NUMERALS 1 work mounting system
2 body (second work)
2A inner panel (mounting part)
3 sunroof member (first work)
4 conveying robot
5 mounting robot
6 controller (control means)
23 nut runner (tightening device)
32 bolt hole (reference part)
51A bolt (fastening member)
241 CCD camera

PREFERRED MODE FOR CARRYING OUT THE INVENTION

Figure 1:
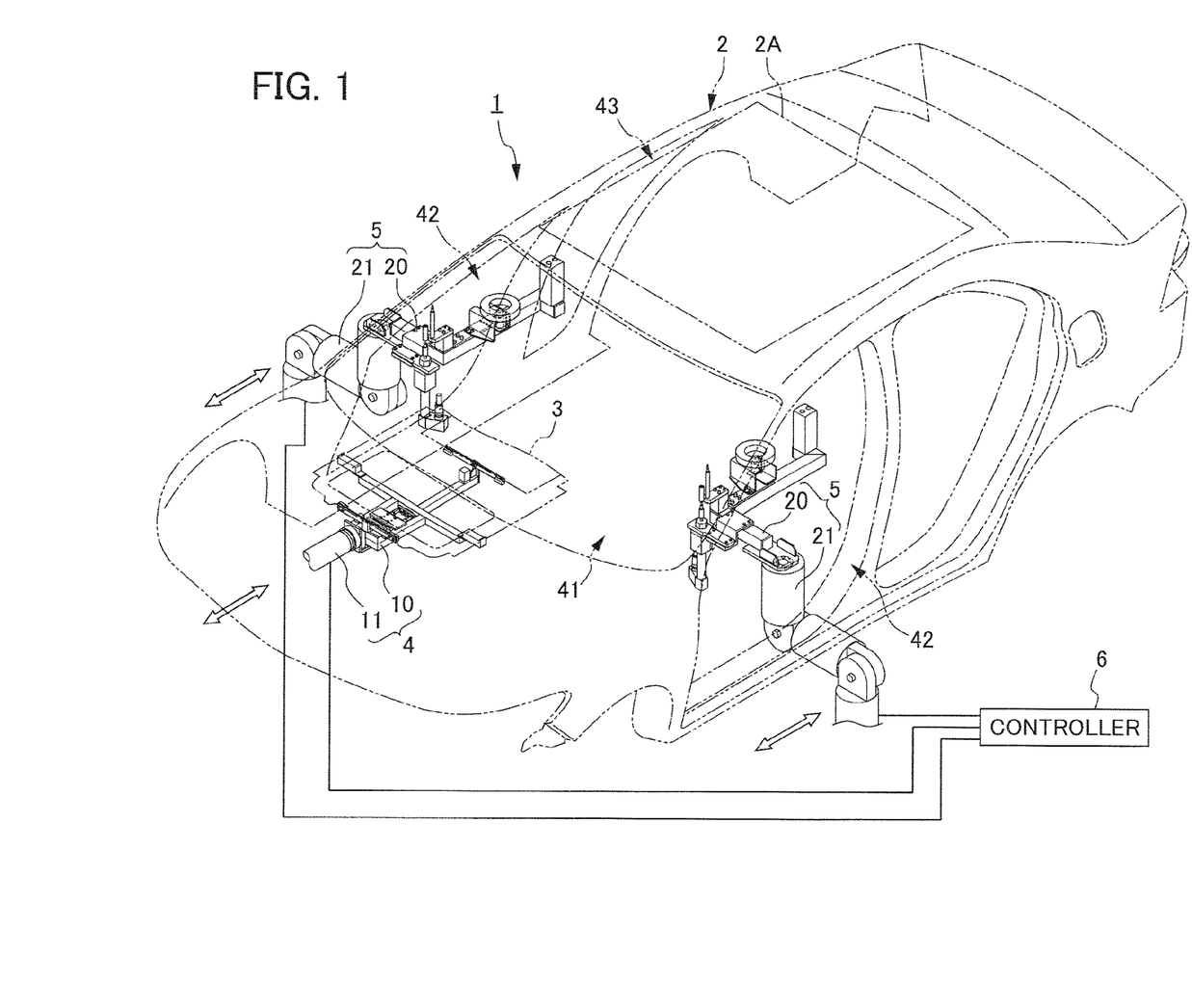
FIG. 1 is an overall perspective view of a work mounting system according to an embodiment of the present invention.

Hereinafter, embodiments of the present invention will be explained based on the drawings. It should be noted that, in the following explanation of embodiments, the same reference symbols are assigned for the same constituent elements, and explanations thereof are omitted or simplified First Embodiment FIG. 1 is an overall perspective view of a work mounting system 1 according to a first embodiment of the present invention.

The work mounting system 1 mounts a sunroof member 3 as a first work to a body 2 as a second work that is conveyed by a conveyor, which is not illustrated.

An opening 41 for a front window in which the front window is mounted is formed in the front of the body 2, and openings 42 for front doors in which the front doors are mounted are formed on both sides of the body 2.

The sunroof member 3 is mounted to a roof 43 of the body 2 from an interior side of the body 2.

The work mounting system 1 includes a conveying robot 4 that conveys the sunroof member 3 up to a vicinity of a mounting position of the body 2, a pair of mounting robots 5 that positions the sunroof member 3 conveyed by the conveying robot 4 with respect to the body 2, and a controller 6 as control means that controls the conveying robot 4 and mounting robots 5.

Figure 2:
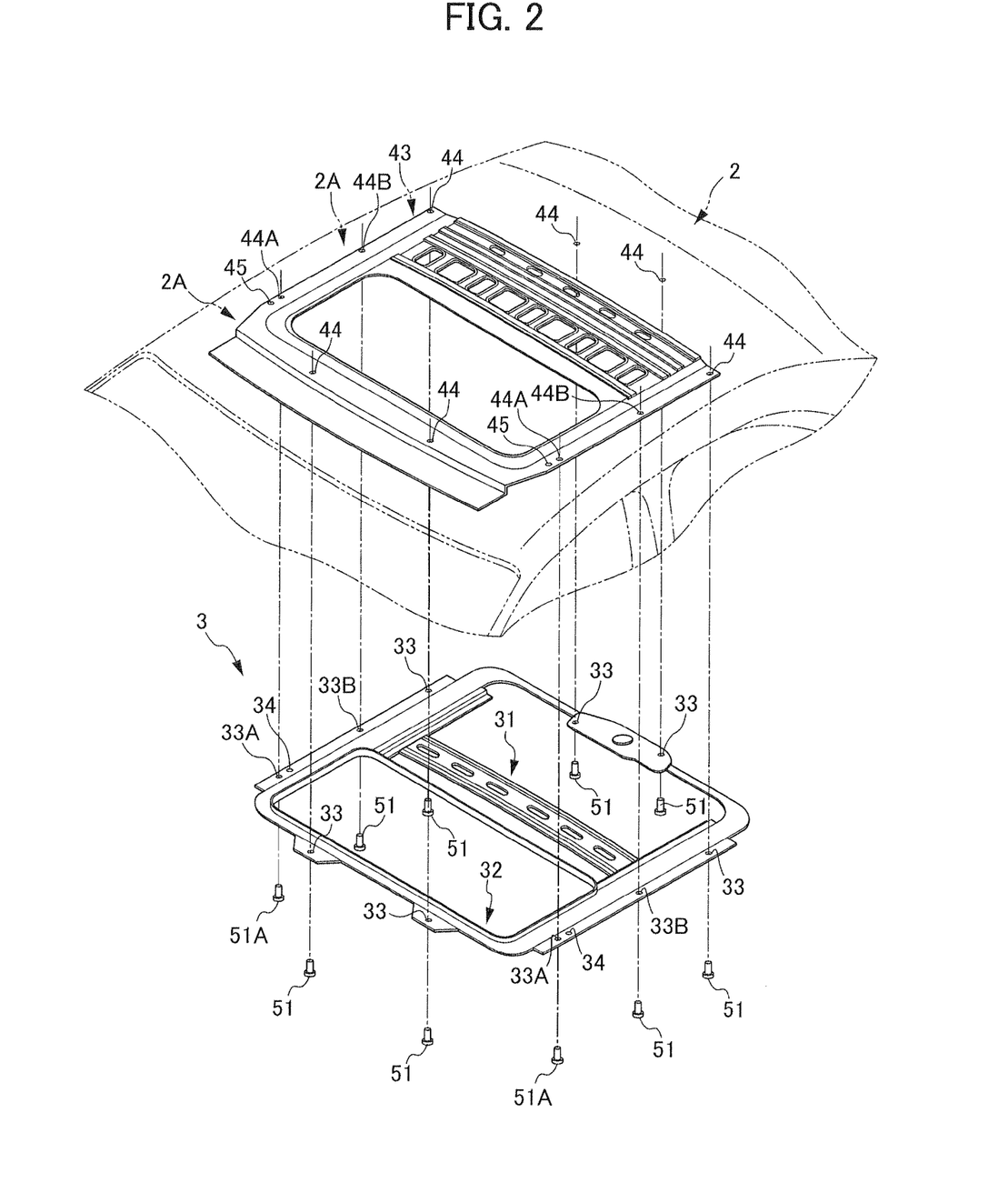
FIG. 2 is a perspective view of a first work and a second work of the work mounting system according to the embodiment.

FIG. 2 is a perspective view of the sunroof member 3 and an inner panel 2A as a mounting part to which the sunroof member 3 is mounted.

The sunroof member 3 includes a frame 31 of a rectangular frame shape, and a reinforcement frame 32 that is provided to straddle frames on both sides of this frame 31.

Eight bolt holes 33 are formed as reference parts in a rim portion of this sunroof member 3. Holes among these bolt holes 33 that are positioned frontward on both sides of the sunroof member 3 are regarded as bolt holes 33A, and a locating hole 34 is formed in a vicinity of each bolt hole 33A. In addition, a hole among the bolt holes 33 that is adjacent on a rearward side of each bolt hole 33A is regarded as a bolt hole 33B.

The inner panel 2A is a panel constituting an inner side of the roof 43 of the body 2. Nuts 44 are formed in the inner panel 2A to correspond to the bolt holes 33 of the sunroof member 3. If nuts corresponding to the bolt holes 33A of the sunroof member 3 are regarded as nuts 44A among these nuts 44, locating holes 45 are formed to correspond to locating holes 34 of the sunroof member 3 in vicinities of the nuts 44A. In addition, nuts corresponding to bolt holes 33B of the sunroof member 3 among the nuts 44 are regarded as nuts 44B.

Bolts 51 are inserted from the interior side of the body 2 into the bolt holes 33 of the sunroof member 3 to be screwed with the nuts 44 of the inner panel 2A, such that the sunroof member 3 is mounted to the inner panel 2A. Herein, a bolt among the bolts 51 that is screwed with each nut 44A is regarded as a bolt 51A.

Referring again to FIG. 1, the conveying robot 4 is disposed on a front side of the body 2. The conveying robot 4 moves towards the body 2 while gripping the sunroof member 3 so as to convey the sunroof member 3 thus gripped to the interior of the body 2.

The conveying robot 4 includes a conveying hand 10 and a robot arm 11. The robot arm 11 is provided to be movable on a floor surface along a longitudinal direction of the body 2, and is configured to cause an attitude and a position in three-dimensional space of the conveying hand 10 to change.

Figure 3:
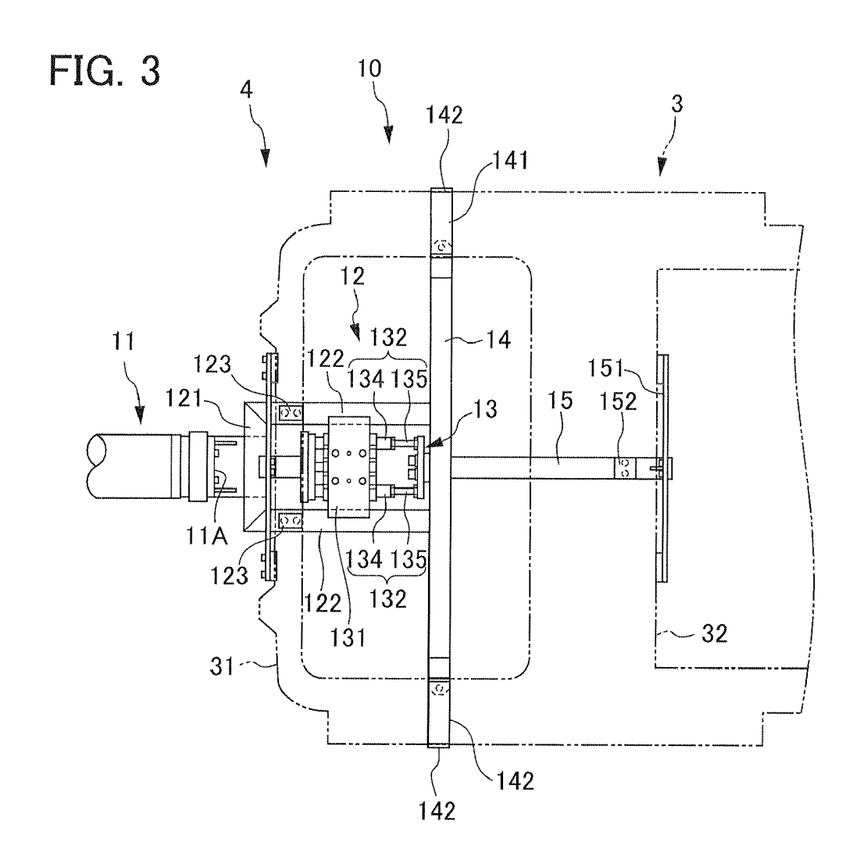
FIG. 3 is a plan view of a hand of a conveying robot according to the embodiment.
Figure 4:
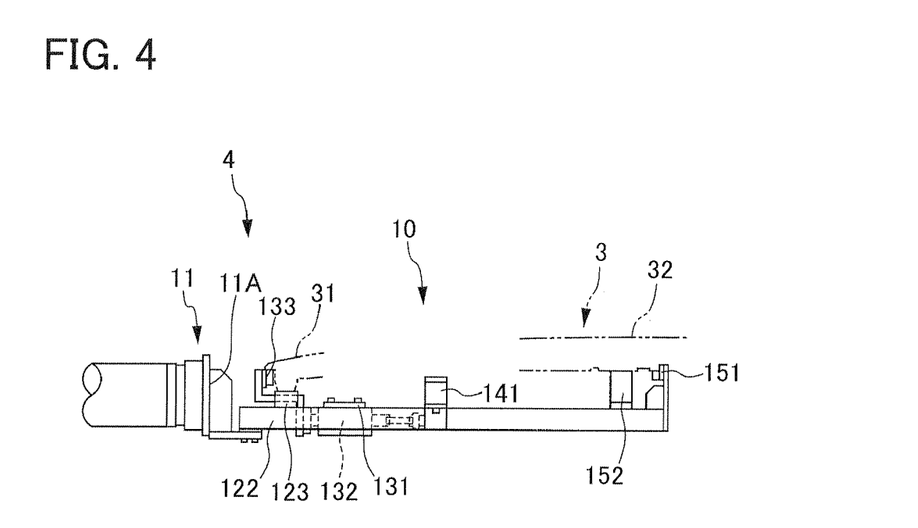
FIG. 4 is a side view of the hand of the conveying robot according to the embodiment.
Figure 5:
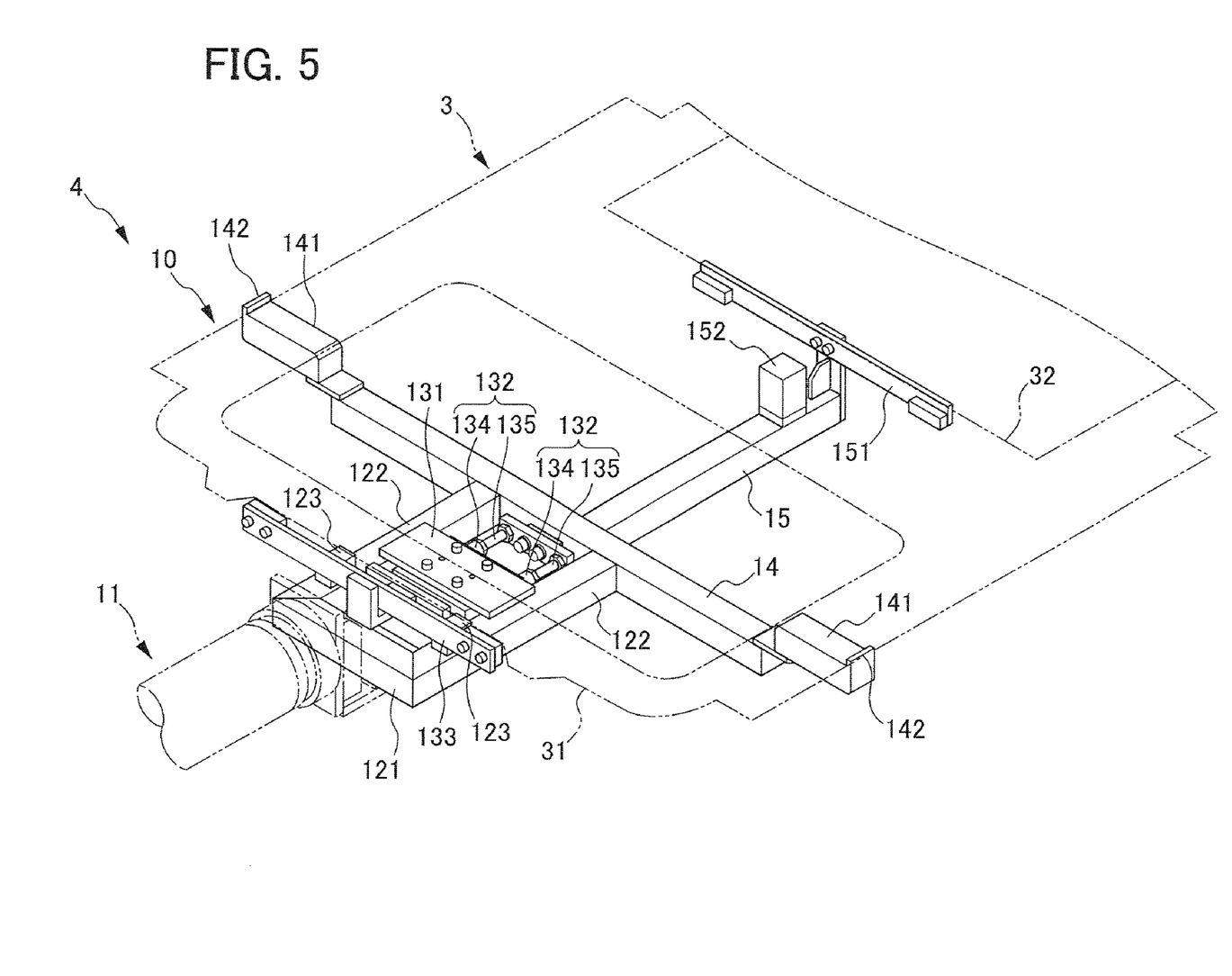
FIG. 5 is a perspective view of the hand of the conveying robot according to the embodiment.

FIG. 3 is a plan view of the conveying hand 10 of the conveying robot 4. FIG. 4 is a side view of the conveying hand 10. FIG. 5 is a perspective view of the conveying hand 10.

The conveying hand 10 is a substantially cross shape in a planar view, and includes a base 12 extending substantially vertically relative to a flange surface 11A of the robot arm 11, a gripping mechanism 13 provided to the base 12, a first support frame 14 extending from an end of the base 12 orthogonally to the base 12 on both sides, and a second support frame 15 extending from the end of the base 12 in the same direction as the base 12.

Receivers 141 are fixed on both ends of the first support frame 14, respectively. A projection 142 is provided to a top end side of each receiver 141.

It should be noted that, although the receivers 141 are fixed to both ends of the first support frame 14 in the present embodiment, it is not limited thereto, and the receivers may be alternatively configured to freely slide along the first support frame.

A fixed gripping portion 151 that extends at both sides of the second support frame 15 is fixed to an end of the second support frame 15. It should be noted that, although the fixed gripping portion 151 is fixed to the end of the second support frame 15 in the present embodiment, it is not limited thereto, and the fixed gripping portion may be alternatively configured to freely slide along the second support frame.

In addition, a support portion 152 that supports the sunroof member 3 is provided to an upper surface of an end side of the second support frame 15.

The base 12 is a substantially U-shape in a planar view, and includes a first frame 121 extending along the flange surface 11A of the robot arm 11, and two second frames 122 that extend substantially vertically relative to the flange surface 11A of the robot arm 11 from both ends of the first frame 121.

Support members 123 supporting the sunroof member 3 are provided to a top surface of the second frames 122, respectively.

The gripping mechanism 13 includes a slide guide 131 that is provided to extend onto the two second frames 122 of the base 12, a pair of cylinders 132 that are slidably supported to this slide guide 131, and a moveable gripping portion 133 that is provided to a base end side of the cylinders 132.

Each cylinder 132 includes a cylinder main body 134, and a piston rod 135 that is slidably accommodated in the cylinder main body 134.

An end of the piston rod 135 is fixed to the aforementioned first support frame 14.

The gripping mechanism 13 causes the piston rods 135 to advance, so that the cylinder main bodies 134 move along the slide guide 131 toward the robot arm 11. Accordingly, the moveable gripping portion 133 moves away from the fixed gripping portion 151 of the second support frame 15. On the other hand, when the piston rods 135 are retracted, the cylinder main bodies 134 move along the slide guide 131 toward the second support frame 15. Accordingly, the moveable gripping portion 133 approaches the fixed gripping portion 151 of the second support frame 15.

In this manner, with the conveying hand 10 of the conveying robot 4, the sunroof member 3 is supported at the receivers 141 of the first support frame 14, the support portions 123 of the base 12, and the support portion 152 of the second support frame 15, when the sunroof member 3 is placed on the conveying hand 10. At the same time, the sunroof member 3 fits between the two projections 142 from both end sides in a width direction.

Subsequently, when the gripping mechanism 13 is driven, it causes the moveable gripping portion 133 to approach the fixed gripping portion 151, such that the fixed griping portion 151 come into contact with the reinforcement frame 32 of the sunroof member 3 and the moveable gripping portion 133 comes into contact with the base end side of the frame 31 of the sunroof member 3, thereby gripping the frame of this sunroof member 3 from both end sides in the longitudinal direction.

Referring again to FIG. 1, the pair of mounting robots 5 is disposed on both sides of the body 2, and fixes the sunroof member 3 conveyed by the conveying robot 4 to the inner panel 2A of the body 2.

These mounting robots 5 each include a hand 20, and a robot arm 21 that is provided on a floor surface and causes an attitude and position in three-dimensional space of the hand 20 to change.

Although the mounting robot 5 positioned on the left side of the body 2 is explained hereinafter, the mounting robot 5 positioned on the right side of the body 2 has a similar configuration, and these mounting robots 5 on the left and right appear to be symmetrical with each other with respect to the body 2.

Figure 6:
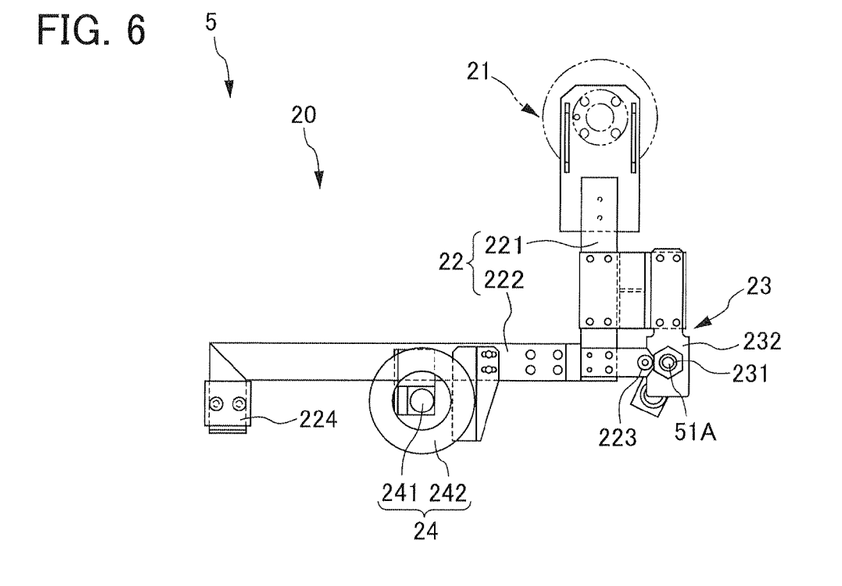
FIG. 6 is a plan view of a hand of a mounting robot according to the embodiment.
Figure 7:
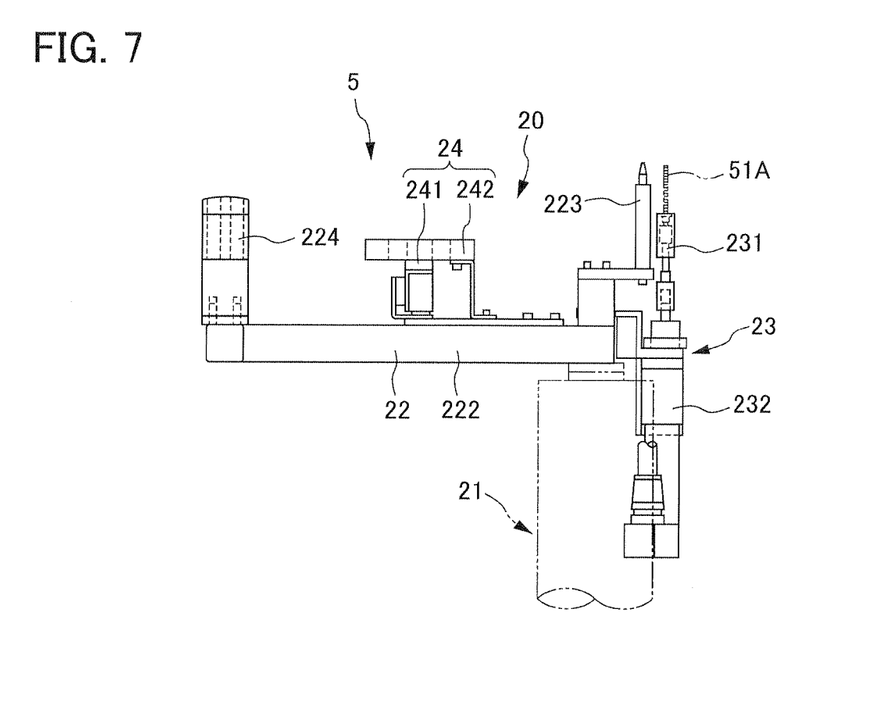
FIG. 7 is a side view of the hand of the mounting robot according to the embodiment.
Figure 8:
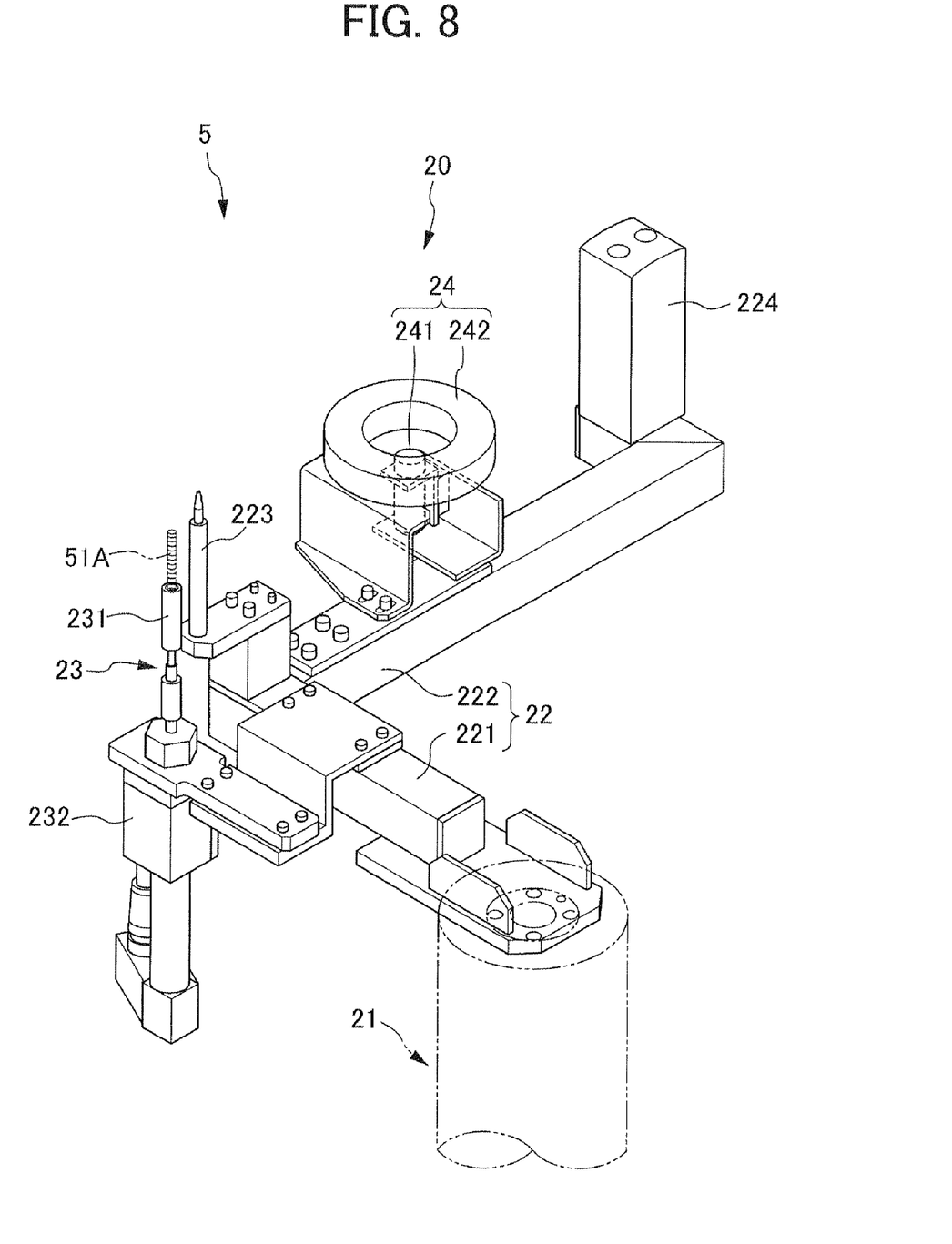
FIG. 8 is a perspective view of the hand of the mounting robot according to the embodiment.

FIG. 6 is a plan view of the hand 20 of the mounting robot 5. FIG. 7 is a side view of the hand 20. FIG. 8 is a perspective view of the hand 20.

The hand 20 includes a support frame 22 of a substantially L-shape, a nut runner 23 as a tightening device provided to the support frame 22, and an imaging device 24 provided to the support frame 22.

The support frame 22 includes a first frame 221 that extends in an in-plane direction from a flange surface of the robot arm 21, and a second frame 222 that extends orthogonally to the first frame 221 from the end of the first frame 221.

A locating pin 223 protruding upward is provided at an intersecting portion of the first frame 221 and the second frame 222. In addition, a work supporting pad 224 is provided on an upper surface on an end side of the second frame 222.

The nut runner 23 is provided in the first frame 221 of the support frame 22, and includes a socket 231 in which the bolt 51A fits as a fastening member, and a drive mechanism 232 that rotationally drives the socket 231.

The nut runner 23 causes the bolt 51A fitted to the socket 231 to rotate with a predetermined torque when the drive mechanism 232 is driven.

The imaging device 24 is provided in the second frame 222 of the support frame 22, and includes a CCD camera 241 that is disposed facing upward, and a lighting device 242 of a ring shape that illuminates the photography target of the CCD camera 241.

Figure 9:
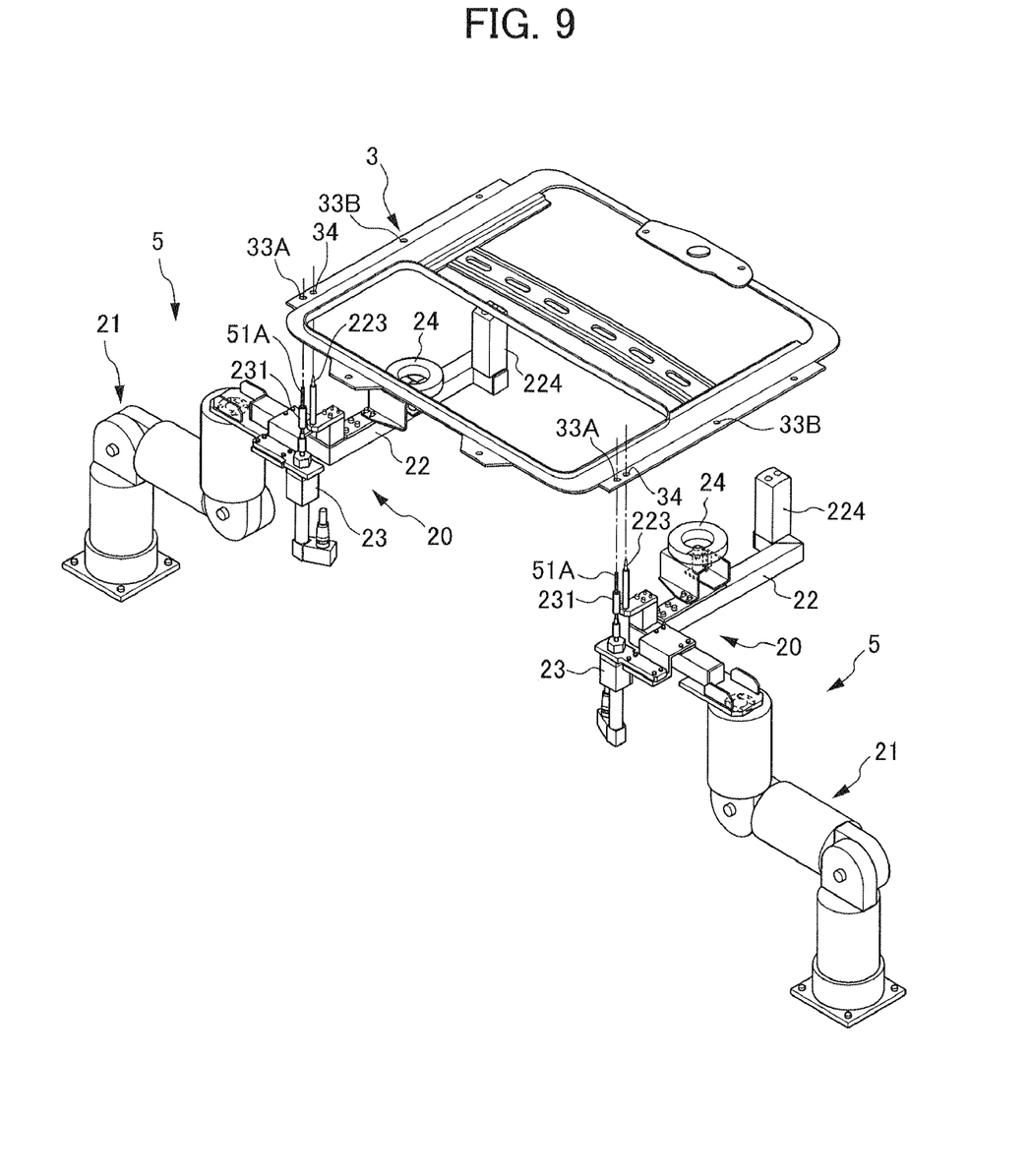
FIG. 9 is an exploded perspective view showing a state in which the first work is supported by the mounting robot according to the embodiment.

With the hand 20 of the mounting robot 5 as shown in FIG. 9, the locating pin 223 of the support frame 22 is inserted into the locating hole 34 of the sunroof member 3, when the sunroof member 3 is placed on the hand 20. Then, this sunroof member 3 is supported by the locating pin 223 and the work supporting pad 224 of the support frame 22. In addition, the bolt 51A that is chucked in the socket 231 of the nut runner 23 is inserted into the bolt hole 33A of the sunroof member 3.

Figure 10:
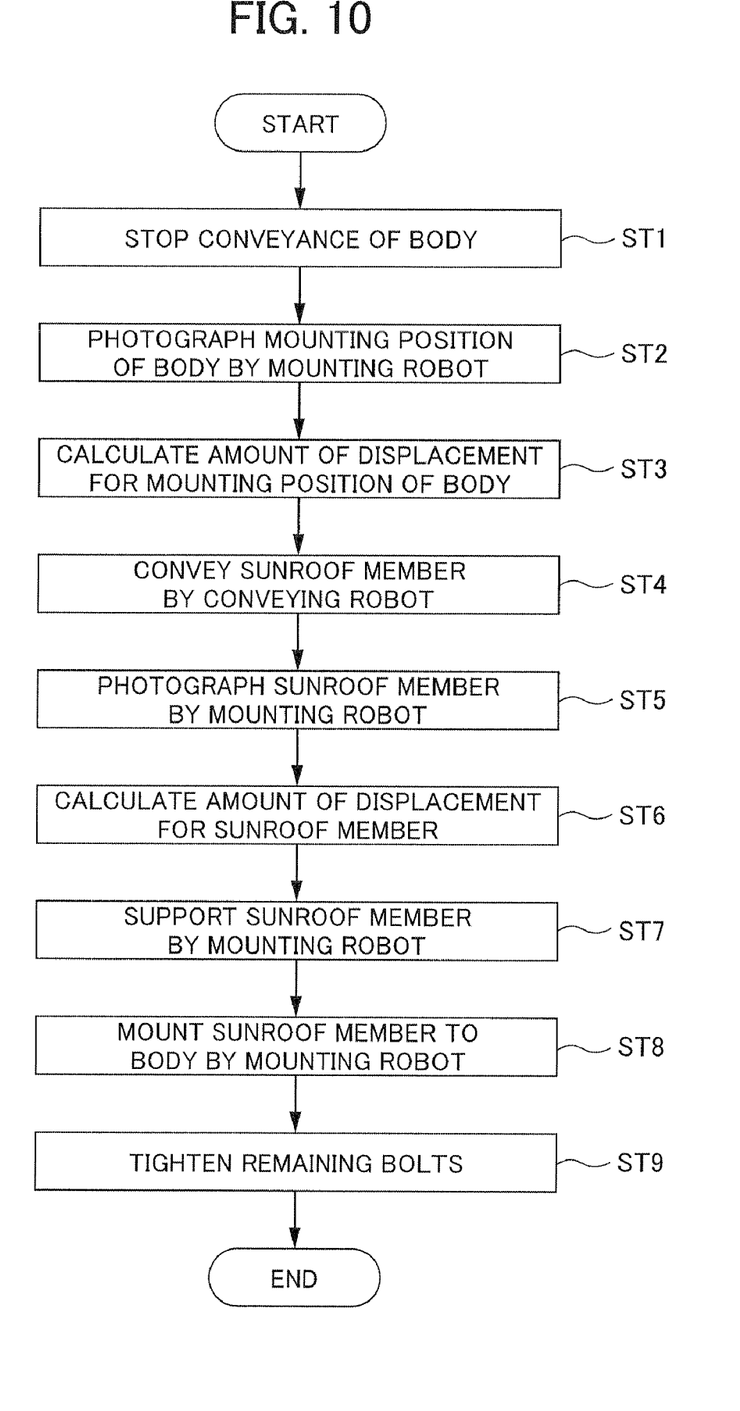
FIG. 10 is a flowchart of operations of the work mounting system according to the embodiment.

Operations of the work mounting system 1 will be explained while referring to the flowchart of FIG. 10. In ST1, conveyance of the body 2 is interrupted. In ST2, the mounting robots 5 are guided through the openings 42 for the front doors on both sides of the body 2 into the interior of the body 2, and the CCD cameras 241 of the mounting robots 5 are made to approach the inner panel 2A of the roof 43. Next, nuts 44B of the inner panel 2A are photographed by the CCD cameras 241, after which the mounting robots 5 are made to vacate.

In ST3, an amount of displacement from a position taught in advance of each nut 44B is calculated as an amount of displacement for a work mounting position by the controller 6 based on the photographed image of the inner panel 2A.

In ST4, the sunroof member 3 is made to be gripped by the conveying robot 4 at a work supply location that is not illustrated. Then, the conveying robot 4 is moved so as to convey the sunroof member 3. The sunroof member 3 is guided through the opening 41 for the front window of the body 2 into the interior of the body 2. The sunroof member 3 is made to stop below the inner panel 2A.

In ST 5, the mounting robots 5 are guided through the openings 42 for the front doors of the body 2 into the interior of the body 2 again. The bolt holes 33B of the sunroof member 3 are photographed as reference positions by the CCD cameras 241.

In ST6, an amount of displacement from a position taught in advance for each bolt hole 33B is calculated as an amount of displacement for a work position by the controller 6 based on the photographed image of the sunroof member 3.

In ST7, the mounting robots 5 are controlled to approach the sunroof member 3 from below. The locating pins 223 are inserted in the locating holes 34 of the sunroof member 3 while both end sides of the sunroof member 3 are supported by the mounting robots 5. Herein, the aforementioned amount of displacement of a work position is applied to each mounting robot 5, so that the movement of each mounting robot 5 is corrected. Thereafter, the conveying robot 4 is made to vacate from the interior of the body 2.

In ST8, the mounting robots 5 are lifted such that the locating pins 223 are inserted into the locating holes 45 of the body 2 and the sunroof member 3 is positioned to the inner panel 2A of the body 2. Herein, the aforementioned amount of displacement for a work mounting position and the amount of work displacement are applied to the movement of each mounting robot 5, thereby correcting the movement of each mounting robot 5.

When such an operation is performed, the bolt holes 33A of the sunroof member 3 come in line with the nuts 44A of the body 2. Accordingly, the nut runners 23 are driven, such that two of the bolts 51A pass through the bolt holes 33A of the sunroof member 3 and are tightened to the nuts 44A of the body 2.

In ST9, remaining bolts 51 excluding the bolts 51A are prepared by a bolt tightening robot not illustrated, and these remaining bolts 51 are guided through the bolt holes 33 of the sunroof member 3, and are tightened to the nuts 44.

According to the present embodiment, there are the following effects.

(1) First, the inner panel 2A of the body 2 is photographed by the CCD camera 241 of the mounting robot 5, and the amount of displacement from the position taught in advance for the nut 44 of the inner panel 2A is calculated based on this photographed image. Next, the conveying robot 4 grips the sunroof member 3 at the work supply location and conveys the sunroof member 3 such that the sunroof member 3 is positioned in the vicinity of the inner panel 2A. Next, the bolt hole 33 of the sunroof member 3 is photographed by the CCD camera 241 of the mounting robot 5, and the amount of displacement from the position taught in advance for the bolt hole 33 is calculated based on the photographed image. Next, two locations on the sunroof member 3 are fixed to the inner panel 2A by the bolts 51A by way of the nut runners 23 of the mounting robots 5. Herein, the amount of displacement of the nut 44 for the inner panel 2A and the amount of displacement for the bolt hole 33 of the sunroof member 3 calculated are applied to the movement of each mounting robot 5, thereby correcting the movement of each mounting robot 5.

In this way, the roles are divided between the conveying robot 4 and the mounting robot 5 such that the conveying robot 4 performs only conveyance of the sunroof member 3 and the mounting robot 5 performs only positioning and mounting of the sunroof member 3. Since it is possible to cope with a case where shapes of sunroof members 3 differ greatly from a model to another by making each of the conveying robot 4 and the mounting robot 5 structurally optimum according to the roles thereof, the versatility is raised.

In addition, since the conveying robot 4 and the mounting robot 5 can be simply configured, the work mounting system 1 can be reduced in size.

Moreover, since the CCD camera 241 and the nut runner 23 are built into the mounting robot 5, it is possible to perform the operation to fix the sunroof member 3 to the inner panel 2A continuously after the bolt hole 33 of the sunroof member 3 and the nut 44 of the inner panel 2A have been sensed by the CCD camera 241. Accordingly, the operational work hours can be shortened.

Second Embodiment

In a second present embodiment, operations of the work mounting system 1 differ from the first embodiment. Specifically, in the first embodiment, the sunroof member 3 is photographed by the mounting robot 5 after the conveyance of the sunroof member 3 by the conveying robot 4 has completed. On the other hand, in the second embodiment, the sunroof member 3 is photographed by the mounting robot 5 simultaneously when the conveyance of the sunroof member 3 has been started by the conveying robot 4.

Figure 11:
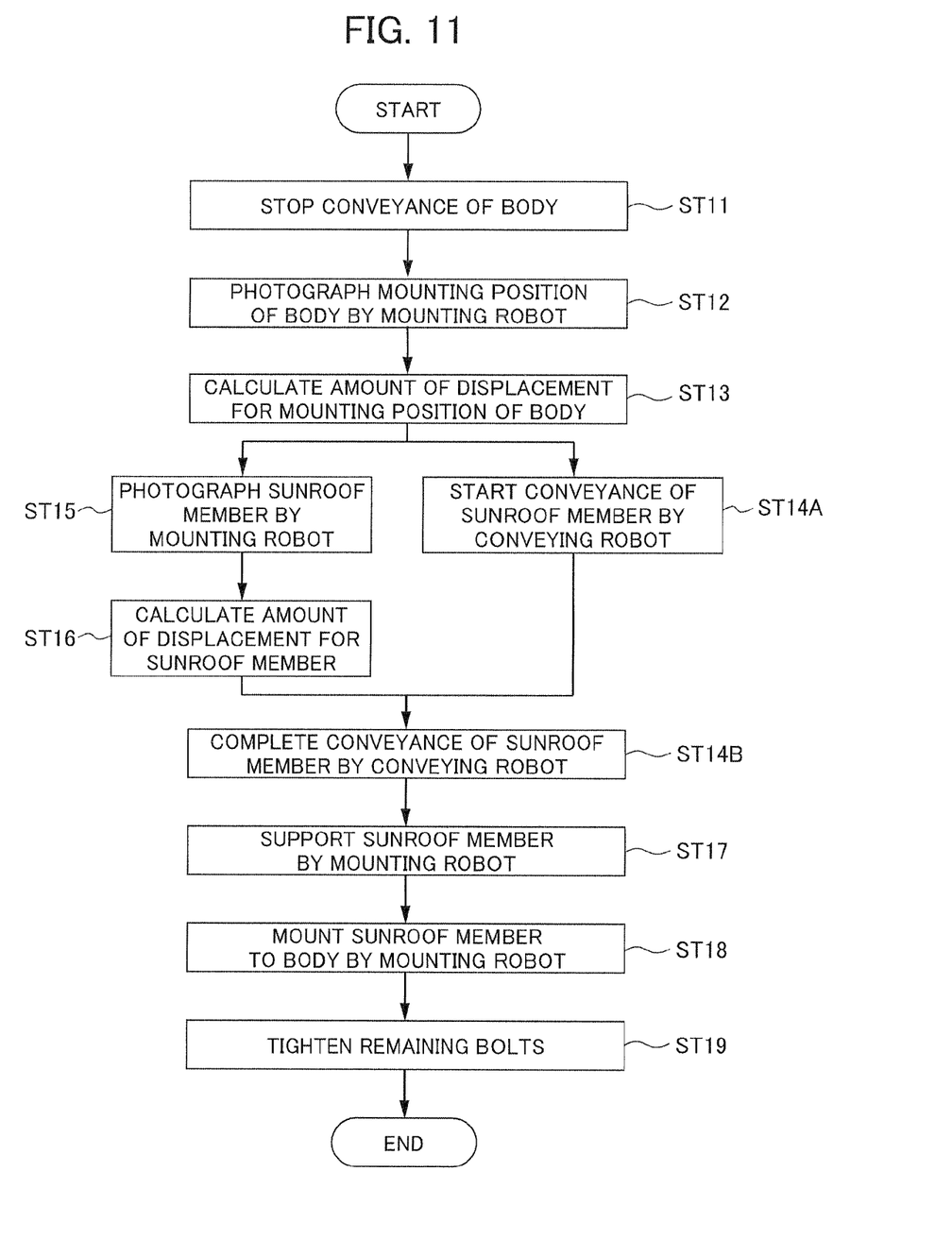
FIG. 11 is a flowchart of operations of the work mounting system according to a second embodiment of the present invention.

Operations of the work mounting system 1 of the second embodiment will be explained while referring to the flowchart of FIG. 11.

ST11 to ST13 and ST17 to ST19 of the second embodiment are similar to ST1 to ST3 and ST7 to ST9 of the first embodiment.

In ST14A, the sunroof member 3 is made to be gripped by the conveying robot 4 at a work supply location that is not illustrated. Then, the conveying robot 4 is moved such that conveyance of the sunroof member 3 is started toward the opening 41 for the front window of the body 2.

In ST15, the mounting robots 5 are positioned below the sunroof member 3 being conveyed. Under such a situation, the mounting robots 5 are moved synchronously with the movement of the conveying robot 4 until the sunroof member 3 reaches the opening 41 for the front window of the body 2. The CCD cameras 241 of the mounting robots 5 photograph the bolt holes 33B of the sunroof member 3 as reference positions.

In ST16, the controller 6 calculates an amount of displacement from a position taught in advance for each bolt hole 33B as an amount of displacement for a work position based on the photographed image of the sunroof member 3.

In ST14B, the conveying robot 4 causes the sunroof member 3 to pass through the opening 41 for the front window of the body 2 into the interior of the body 2, and to stop below the inner panel 2A.

At this time, the sunroof member 3 is made to stop so that the locating holes 34 of the sunroof member 3 are positioned directly under the locating holes 45 of the body 2, based on the amount of displacement for a work position and the amount of displacement of a work mounting position calculated in ST3.

According to the present embodiment, in addition to the aforementioned effects of (1), there are the following effects.

(2) At the moment when the sunroof member 3 enters the interior of the body 2, the amount of displacement of a work position and the amount of displacement for a work mounting position have already been calculated. Accordingly, it is possible to stop the sunroof member 3 so that the locating holes 34 of the sunroof member 3 are positioned directly below the locating holes 45 of the body 2.

In addition, it is possible to position the mounting robots 5 directly below the sunroof member 3 immediately after the sunroof member 3 has been made to stop below the inner panel 2A, omitting the step of photographing the sunroof member 3 as in the first embodiment. Then, if the hands 20 are simply raised from this state, it is possible that the sunroof member 3 is supported and the positioning of the sunroof member 3 is performed on the inner panel 2A of the body 2.

In this manner, the cycle time can be further shortened.

It should be noted that the present invention is not matter that is limited to the embodiments, and modifications, improvements, and the like within a scope that can achieve the object of the present invention are included in the present invention.

The invention claimed is:

1. A work mounting system that mounts a first work to a mounting part of a second work with a fastening member, comprising:
    a conveying robot configured to grip and convey the first work;
    a pair of mounting robots having a camera and a tightening device configured to tighten the fastening member, and supporting the first work at both end sides;
    control means configured to control the conveying robot and the pair of mounting robots,
    wherein the control means is configured to:
    control the conveying robot to grip and convey the first work to the mounting part of the second work;
    control the pair of mounting robots to photograph by the camera a reference part of the first work and a mounting part of the second work;
    calculate positions of the reference part of the first work and of the mounting part of the second work;
    correct movement of at least one among the conveying robot and the pair of mounting robots based on the positions thus calculated; and
    cause the pair of mounting robots to support the first work at both end sides, and then cause the tightening device to fix at least two locations of the first work to the mounting part of the second work.

2. A work mounting method of mounting a first work to a mounting part of a second work with a fastening member, while using a conveying robot configured to grip and convey the first work and a pair of mounting robots having a camera and a tightening device configured to tighten the fastening member, and supporting the first work at both end sides, the method comprising:
    controlling the pair of mounting robots to photograph the mounting part of the second work by the camera, and calculating a position of the mounting part of the second work;
    controlling the conveying robot to grip and convey the first work to a vicinity of the mounting part of the second work;
    controlling the pair of mounting robots to photograph a reference part of the first work by the camera;
    calculating a position of the reference part of the first work;
    correcting movement of the mounting robots based on the positions of the reference part of the first work and the mounting part of the second work; and
    supporting the first work at both end sides by the pair of mounting robots, and then causing the tightening device to fix at least two locations of the first work to the mounting part of the second work.

3. A work mounting method of mounting a first work to a mounting part of a second work with a fastening member, while using a conveying robot configured to grip and convey the first work and a pair of mounting robots having a camera and a tightening device configured to tighten the fastening member, and supporting the first work at both end sides, the method comprising:

controlling the pair of mounting robots to photograph a mounting part of the second work by the camera, and calculating a position of the mounting part of the second work;

controlling the conveying robot to grip the first work and start conveyance thereof towards the mounting part of the second work, controlling the pair of mounting robots to photograph a reference part of the first work by the camera, and calculating a position of the reference part of the first work;

correcting movement of the conveying robot based on the positions of the reference part of the first work and the mounting part of the second work, and conveying the first work to a vicinity of the mounting part of the second work;

correcting movement of the pair of mounting robots based on the position of the mounting part of the second work, and supporting the first work at both end sides by the pair of mounting robots, and then causing the tightening device to fix at least two locations of the first work to the mounting part of the second work.

\* \* \* \* \*